United States Patent [19]

Kim

[11] Patent Number: 5,206,714
[45] Date of Patent: Apr. 27, 1993

[54] CIRCUIT FOR CONTROLLING THE TIME INTERVAL BETWEEN ROTATIONAL MOVEMENTS OF A PLURALITY OF SUBORDINATE PICTURES IN A PICTURE-IN-PICTURE-TYPE TELEVISION OR VTR SYSTEM AND METHOD THEREFOR

[75] Inventor: Yong-Je Kim, Jinhae, Rep. of Korea
[73] Assignee: Samsung Electronics Co., Ltd., Kyungki, Rep. of Korea
[21] Appl. No.: 331,352
[22] Filed: Mar. 31, 1989
[30] Foreign Application Priority Data Apr. 16, 1988 [KR] Rep. of Korea ............... 1988-4339

[51] Int. Cl.$^5$ ................... H04N 9/74; H04N 5/262
[52] U.S. Cl. ............................... 358/22; 358/181; 358/183
[58] Field of Search ............ 358/22, 181, 183, 182; 340/723, 724

[56] References Cited

U.S. PATENT DOCUMENTS

| | | | |
|---|---|---|---|
| 4,725,888 | 2/1988 | Hakamada | 358/22 |
| 4,746,983 | 5/1988 | Hakamada | 358/22 |
| 4,750,039 | 6/1988 | Willis | 358/22 |
| 4,768,095 | 8/1988 | Wada et al. | 358/22 |
| 4,774,582 | 9/1988 | Hakamada et al. | 358/22 |
| 4,794,386 | 12/1988 | Bedrij et al. | 340/724 |
| 4,821,102 | 4/1989 | Ichikawa et al. | 358/183 |
| 4,918,531 | 4/1990 | Johnson | 358/183 |
| 4,998,171 | 3/1991 | Kim et al. | 358/22 |

FOREIGN PATENT DOCUMENTS

63-169186 7/1988 Japan.

Primary Examiner—Edward L. Coles, Sr.
Assistant Examiner—Thomas D. Lee
Attorney, Agent, or Firm—Robert E. Bushnell

[57] ABSTRACT

There is disclosed a circuit for controlling the time interval between rotational movements of a plurality of subordinate pictures in a picture-in-picture-type television. The inventive circuit includes a microcomputer, a memory for storing the PIP video digital data, a control decoder and read/write controller for generating a control signal to control the start of writing or reading subordinate picture data onto or from the memory, a switching stage for switching sequentially the chrominance signals, an analog/digital converter for receiving the output of the switching stage, a first data converting and latching device, a writing clock pulse and writing address signal generator, a second data converting and latching device, first to third digital/analog converters, a reading clock pulse and reading address signal generator, and a memory control timing and address selector.

23 Claims, 3 Drawing Sheets

CIRCUIT FOR CONTROLLING THE TIME INTERVAL BETWEEN ROTATIONAL MOVEMENTS OF A PLURALITY OF SUBORDINATE PICTURES IN A PICTURE-IN-PICTURE-TYPE TELEVISION OR VTR SYSTEM AND METHOD THEREFOR

TECHNICAL BACKGROUND

The present invention concerns a circuit for controlling the time interval between rotational movements of a plurality of subordinate pictures in a picture-in-picture-type television (hereinafter referred to as PIP TV) or video tape recording/playing system.

Generally, a PIP TV/VTR allows another channel to be simultaneously displayed as a small subordinate picture in a particularly assigned region of the main picture presently being displayed, while the previous subordinate picture may be displayed as a still picture in another particularly assigned small region of the main picture. In this case, parts of the main picture are lost because of the subordinate pictures of another channel being displayed simultaneously with the main picture.

If the parts of the main picture presently being lost due to the small subordinate pictures are to be saved, the subordinate pictures must be moved into other regions of the main picture. Conventionally, since two or more subordinate pictures, i.e., a still subordinate picture and a motion subordinate picture, are moved simultaneously into other regions of the main picture, the viewer's sight is agitated.

SUMMARY OF THE PRESENT INVENTION

It is an object of the present invention to provide a circuit for controlling the time interval between the movements of two subordinate pictures in the main picture and a method therefor, which eliminates the agitation of the viewer's sight.

According to the present invention, a circuit for moving rotationally a plurality of subordinate pictures includes:

a memory for storing the PIP video digital data, the video digital data being written onto or read from the memory through dual ports;

a control decoder and read/write controller for generating a control signal to control the start of writing or reading subordinate picture data onto or from the memory and a control signal to select an address for writing or reading the subordinate picture data onto or from the memory, said control decoder and read/write controller receiving mode selecting data, a clock pulse control signal, and a strobe control signal from a microcomputer and main and subordinate picture vertical synchronizing signals separated by a sync separator, the subordinate vertical synchronizing signal being used when said subordinate picture data is written onto the memory, the main picture vertical synchronizing signal being used when the subordinate picture data is read from the memory;

a time interval controller for receiving a recognition signal for moving rotatably two subordinate pictures and the main picture vertical synchronizing signal to generate the control signal to control the writing and reading of the data of the subordinate pictures to be moved onto and from the memory and a control signal to maintain a fixed time interval between the movements of the subordinate pictures, the time interval controller being connected with the control decoder and read/write controller;

a switching means for switching sequentially the chrominance signals of the brightness, red-brightness, and blue-brightness of the subordinate picture to output them sequentially, the chrominance signals being separated by the chroma circuit;

an analog/digital converter for receiving the output of the switching means to convert the analog video signals into digital data;

first data converting and latching device for converting the PIP video digital data of the analog/digital converter into a fixed bit adapted to be stored into the memory and latching it;

a writing clock pulse and writing address signal generator for generating a switching signal to select the bright and chrominance signals for the writing of the switching device, a sampling signal for the digital data conversion of the analog/digital converter, a clock pulse for the converting and latching of the first data converting and latching device, and a clock pulse for refreshing the writing, address and control of the memory by receiving the control signal to control the start of the writing of the control decoder and read/write controller, second basic frequency and the subordinate picture vertical and horizontal synchronizing signals separated by the sync separator;

a second data converting and latching device for converting the data read from the memory into a form adapted for first to third digital/analog data and latching it;

first to third digital/analog converters for converting into analog signals the digital data received from the second data converting and latching device;

a reading clock pulse and reading address signal generator for generating a reading address signal, a latching clock pulse for the data conversion of the second data converting and latching device, and a clock pulse for the first to third digital/analog converters for converting the data into PIP analog signal by receiving the control signal to control the start of the reading from the control decoder and read/write controller, first basic frequency supplied to a timing clock and the horizontal and vertical synchronizing signals separated by a sync separator; and a memory control timing and address selecting device for selecting a writing and reading address and control signal of the outputs of the writing clock pulse and writing address signal generator and the reading clock pulse and reading address signal generator respectively according to the output control signal received form the control decoder and read/write controller.

BRIEF DESCRIPTION OF THE ATTACHED DRAWINGS

For a better understanding of the invention and to show how the same may be carried into effect, reference will now be made, by way of example, to the accompanying diagrammatic drawings, in which.

FIG. (2a-2c) is a timing graph for picture selecting according to the present invention.

FIG. (3a-3d) illustrates the switching signal waveforms of switching device 40 generated by writing clock pulse and writing address signal generator 60 according to the present invention; and FIG. (4a-4i) exemplifies the movements of pictures according to the present invention.

DETAILED DESCRIPTION OF A PREFERRED EMBODIMENT

The present invention will now be described in more detail by reference to the drawings attached only by way of example.

Figure 1:
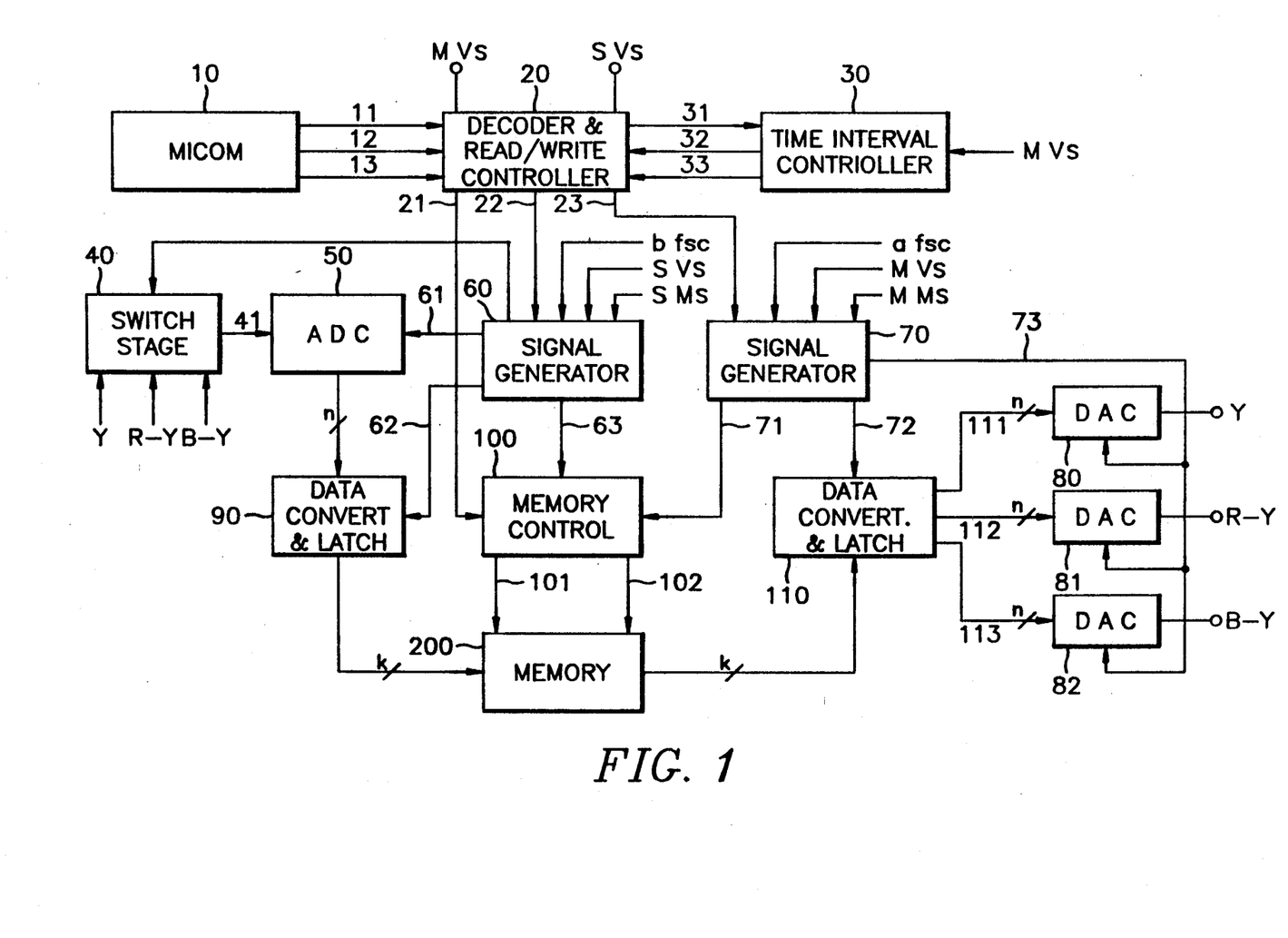
FIG. 1 is a block diagram of the inventive circuit.

Referring to FIG. 1 illustrating the inventive circuit, a microcomputer (MICOM) 10 to control the time interval between the movements of a plurality of subordinate pictures recognizes a mode selecting key signal, generating mode selecting data, system operating clock pulse, and strobe control signal. The PIP video digital data is written onto or read from memory 200 through dual ports.

A control decoder and read/write controller 20 generates a control signal to control the start of writing or reading subordinate picture data onto or from the memory 200 and a control signal to select an address for writing or reading the subordinate picture data onto or from the memory 200. The controller 20 also receives mode selecting data, a clock pulse control signal, and a strobe control signal from the MICOM 10 and main and subordinate picture vertical synchronizing signals MVs, SVs separated by a sync separator (not shown). The subordinate vertical synchronizing signal SVs is used when the subordinate picture data is written onto the memory 200, while the main picture vertical synchronizing signal MVs is used when the subordinate picture data is read from the memory 200.

A time interval controller 30 receives a recognition signal for moving rotatably two subordinate pictures and the main picture vertical synchronizing signal MVs, and generates the control signal to control the writing and reading of the data of the subordinate pictures to be moved onto and from the memory 200 and a control signal to maintain a fixed time interval between the movements of the subordinate pictures. The time interval controller 30 is connected with the control decoder and read/write controller 20.

A switching stage 40 switches sequentially the chrominance signals of the brightness Y, red-brightness R-Y, and blue-brightness B-Y of the subordinate picture to output them sequentially. The chrominance signals are separated by the chroma circuit. An analog/digital converter 50 receives the output of the switching stage 40 to convert the analog video signals into digital data. A first data converter and latch stage 90 converts the PIP video digital data of the analog/digital converter 50 into a fixed bit adapted to be stored into the memory and latches it.

A writing clock pulse and writing address signal generator 60 receives the control signal to control the start of the writing of the control decoder and read/write controller 20, second basic frequency bfsc and the subordinate picture vertical and horizontal synchronizing signals SVs, SHs separated by the sync separator. From the writing clock pulse and writing address signal generator 60 are generated switching signals to select the bright and chrominance signals Y, B-Y, R-Y for the writing of the switching means 40, a sampling signal for the digital data conversion of the analog/digital converter 50, a clock pulse for the converting and latching of the first data converting and latching means, and a clock pulse for refreshing the writing, address and control $\overline{RAS}$, $\overline{CAS}$, $\overline{WE}$ of the memory 200.

A second data converting and latching device 110 converts the data read from the memory 200 into a form adapted to first to third digital/analog data and latches it. First to third digital/analog converters 80–82 convert into analog signals the digital data received from the second data converting and latching means 110.

A reading clock pulse and reading address signal generator 70 receives the control signal to control the start of the reading from the control decoder and read/write controller 20, first basic frequency afsc supplied by a timing clock and the horizontal and vertical synchronizing signals MHs, MVs separated by a synchronization separator. From the generator 70 are generated a reading address signal, a latching clock pulse for the data conversion of the second data converting and latching device 110, and a clock pulse to first to third digital/analog converters 80–82 for converting the data into PIP analog signals.

A memory control timing and address selecting stage 100 selects a writing and reading address and control signal of the outputs of the writing clock pulse and writing address signal generator 60 and the reading clock pulse and reading address signal generator 70 according to the output control signal received from the control decoder and read/write controller 20.

Figure 2A:
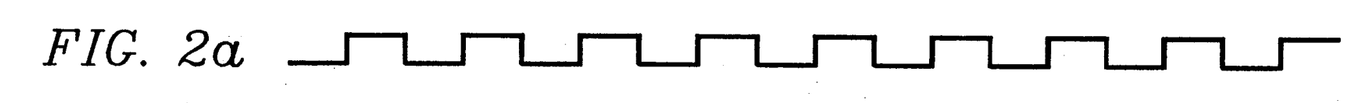
Figure 2B:
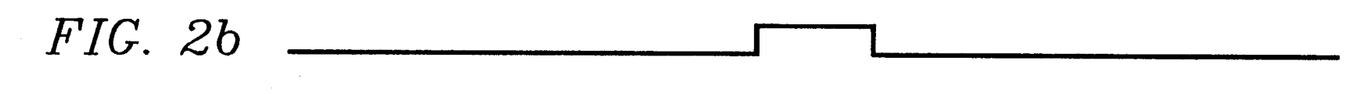
Figure 2C:
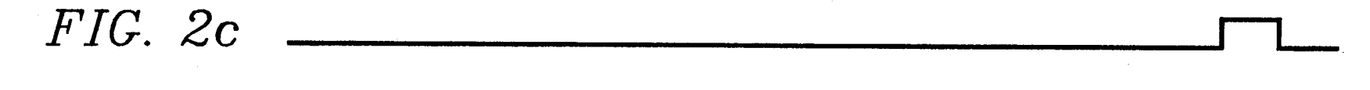

FIG. 2 is a timing graph of picture selecting, from the MICOM 10. 2a indicates the clock pulse generated by the MICOM 10, 2b the waveform of the control data for rotational movements of the subordinate pictures, and 2c the waveform of a signal for enabling the control decoder and read/write controller 20. FIG. 3 illustrates the switching signal waveforms of switching means 40 generated by writing clock pulse and writing address signal generator 60, wherein 3a indicates the switching signal of the brightness (Y), 3b the switching signal of the red (R)-brightness (Y), 3c the switching signal of the blue (B)-brightness (Y), and 3d a sampling clock pulse needed for converting the analog signal into digital data. FIG. 4 exemplifies the movements of pictures according to the present invention.

A specific embodiment of the present invention will now be described with reference to FIGS. 1 through 4. It is assumed that the frame of a channel occupies as the main picture occupies the entire screen of a PIP TV according to the present invention, and the frame of another channel as a subordinate motion picture a small particularly assigned region of the screen. The data of the subordinate motion picture is stored into a memory to present as a still picture on another small particularly assigned region of the full screen the picture preceding the subordinate motion picture presently displayed in the other channel. In this case, parts of the main picture are lost because of the subordinate pictures of the other channel being displayed simultaneously with the main picture. If the parts of the main picture presently being lost due to the small subordinate pictures are to be saved, the subordinate pictures must be moved into other regions of the main picture. The present invention provides a circuit for controlling the time interval between the movements of two subordinate pictures in the main picture.

In order to move the subordinate pictures, the viewer inputs by keyboard or a remote controller ("remo-con") (not show) the value of a predetermined time interval and a mode establishing command into the MICOM 10. The MICOM 10 processes the signals from the keyboard or remo-con. The signals output through the output terminals 11–13 from the MICOM 10 are shown as in FIG. 2. The signal 2a is supplied via lead 11 to the control decoder and read/write controller 20 as a clock pulse, the signal 2b is supplied via lead 12 as the control data for rotating the subordinate pictures, and the signal 2c is supplied via lead 13 as an enabling signal for validating the input signals 2a and 2b. The signals 2a-2c input into the control decoder and read/write controller 20 serve as the register mode data established in a fixed position, being recognized as the picture selecting signal according to variation of a bit (Bit 3). For example, if the control decoder and read/write controller 20 receives the data in the above bit (Bit 3) once, it is set to the mode for displaying one subordinate picture, and twice to the mode for displaying two subordinate pictures, which indicates that there exist a plurality of subordinate pictures.

The control decoder and read/write controller 20 catch the data of the signal 2b at the rising edges of the signal 2a, and enables the entire operation through recognizing that the input data is validated by the strobe signal 2c. If the second bit (bit 2) of the register mode is input as the pertinent signal with the signal for rotation of the subordinate pictures input after decoding the two pictures, the control decoder and read/write controller 20 catches the data 2b at the rising edges of the second bit (Bit 2), recognizing the rotation of the pictures. Hence the number of the second bit (Bit 2) output determines the number of the rotations.

Figure 4A:
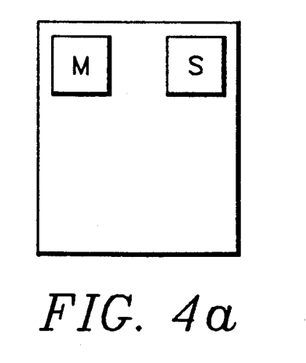

If by the above operation a signal is received for representing two pictures, the control decoder and read/write controller 20 displays in the originally indicated position a picture as shown in FIG. 4a. That the picture is displayed as shown in FIG. 4a will now be specifically described. The writing clock pulse and writing address signal generator 60 receives the control signal to control the start of the writing of the control decoder and read/write controller 20, first basic frequency afsc (a>0, fsc=3.58 MHz) and the subordinate picture vertical and horizontal synchronizing signals SVs, SHs. From the writing clock pulse and writing address signal generator 60 are generated through node 61 switching signals 3a-3c to select the chrominance signals Y, B-Y, R-Y of the switching stage 40. The switching stage 40 sequentially selects the pertinent chrominance signal.

Figure 3A:
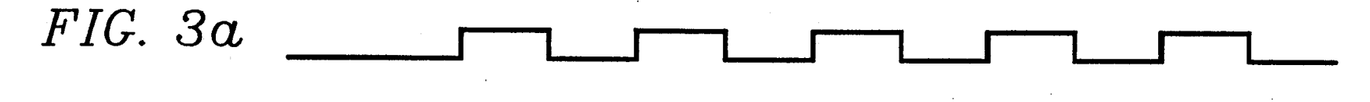
Figure 3B:
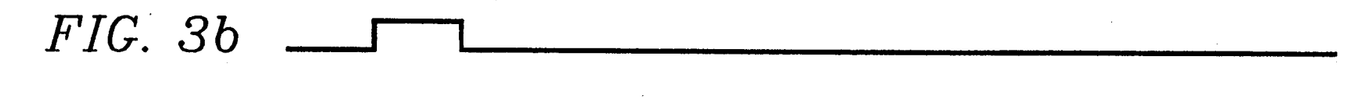
Figure 3C:
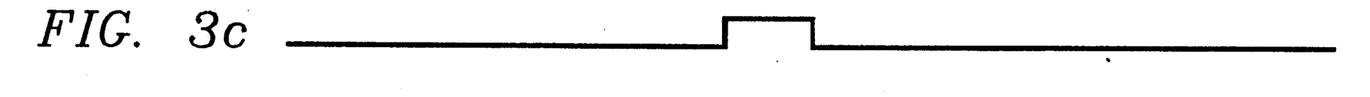
Figure 3D:
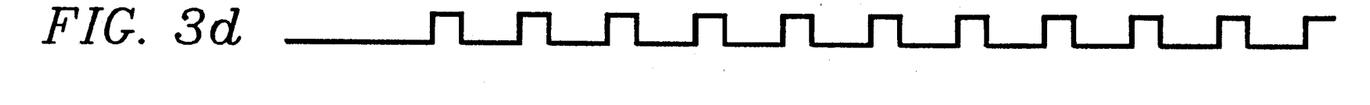

If the switching stage 40 outputs the chrominance signals in series in the order of R-Y, Y, Y, B-Y, Y, Y, R-Y, the analog/digital converter 50 converts the signals into digital data of n (n>b) by the analog/digital converting clock pulse 3d generated by the writing clock pulse and writing address signal generator 60. The converted n bit data is converted into the k (k>0) bit adapted to the data form of the memory 200. By the latching clock pulse generated through line 62 from the writing clock pulse and writing address signal generator 60, the first data converting and latching means 90 converts into the k bit and latches the output data of the analog/digital converter 50.

On the other hand, the memory control timing and address selecting device 100 generates a writing control signal and writing positional address signal by the writing address signal generated through line 63 by the writing clock pulse and writing address signal generator 60 and selecting control signal generated through line 21 by the control decoder and read/write controller 20. The address signal is input into the memory 200, the k bit data generated by the first data converting and latching means 90 is stored into the above designated writing address in the controlling sequence. By the input two pictures displaying control signal, a start reading control signal is input into the reading clock pulse and reading address signal generator 70 through the line 23 of the control decoder and read/write controller 20. The reading clock pulse and reading address signal generator 70 receiving the start reading control signal locates the position to display according to the first basic frequency afsc (a>0, fsc=3.58 MHz) and the main vertical and horizontal synchronizing signals, and generates the reading address signal in order to obtain from the memory 200 the data to be displayed in the pertinent position. In addition, the reading clock pulse and reading address signal generator 70 generates through line 72 a latching clock pulse input into the second data converting and latching means 110.

Meanwhile, the second data converting and latching means 110 converts into n bit form the PIP k bit data stored in the memory 200. The reading clock pulse and reading address signal generator 70 inputs the sampling clock pulse needed for the analog conversion into the first to third digital/analog converters 80-82 through line 73. By the control signal generated from the control decoder and read/write controller 20, the address signal generated by the reading clock pulse and reading address signal generator 70 is input into the memory 200 to read the data to be displayed in the pertinent position. As described above, the data converting and latching device 110 converts the k bit form to be data into the n bit input into the first to third digital/analog converters 80-82. Namely, the second data converting and latching device 110 converts into the n bit and latches the k bit data according to the clock pulses input through the line 72, and sequentially outputs it. The n bit data is converted into an analog signal by the first to third digital/analog converters 80-82, displayed as a motion and a still picture M, S as shown in FIG. 4a.

As described above, if the memory 200 is read, the subordinate picture looks still, and if data being written continuously onto the memory 200 is sequentially read out, the picture looks moving. In the state of moving rotationally the two pictures, if the MICOM 10 inputs the rotational moving signal for the two pictures into the control decoder and read/write controller 20 through lines 11-13, the controller 20 delivers the signal to the time interval controller 30 through lead 31. Then, the time interval controller 30 generates the writing/reading start signal to control the time interval for moving the picture. The signal is inputted into the control decoder and read/write controller 20, which inputs the writing/reading start control signal into the writing/reading clock pulse and writing/reading address signal generators 60, 70 according to the main and subordinate vertical synchronizing signals MVs, SVs. The writing/reading clock pulse and writing/reading address signal generators 60, 70 generate the clock pulse needed for the A/D and D/A conversion, via lead 72 and the latching clock pulse needed for the mutual conversion of data. The writing/reading address signal inputted into the memory 200 is selected by the memory control timing and address selecting device 100. Since the writing/reading clock pulse and writing/reading address signal generators 60, 70 set the reference values of the writing/reading start moments according to the position of rotationally moving the picture as shown in FIG. 4, the rotational moving position of the picture is selected by the writing/reading start control signal from the control decoder and read/write controller 20 through lines 22-23. The time interval between the movements of the pictures is controlled by the control decoder and read/write controller 20 according to the output of the time interval controller 30.

Figure 4B:
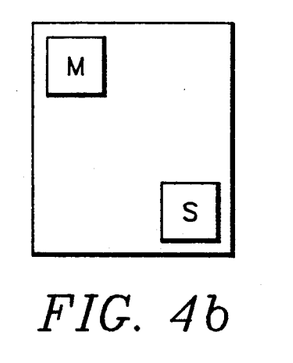
Figure 4C:
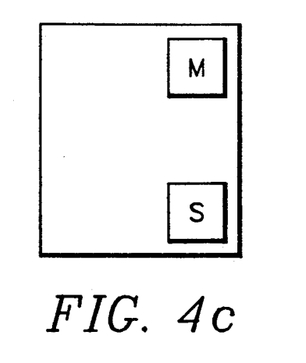
Figure 4D:
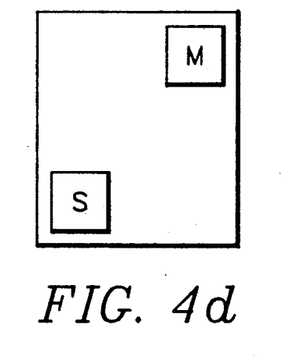
Figure 4E:
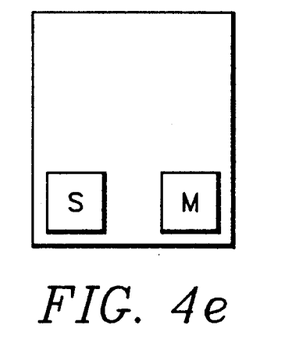
Figure 4F:
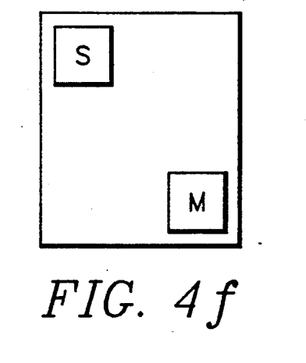
Figure 4G:
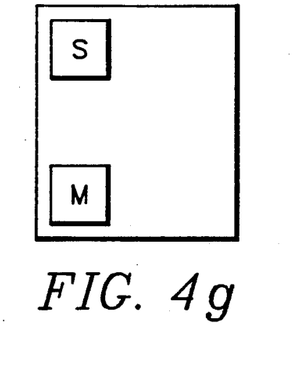
Figure 4H:
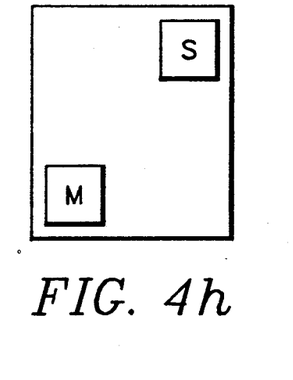
Figure 4I:
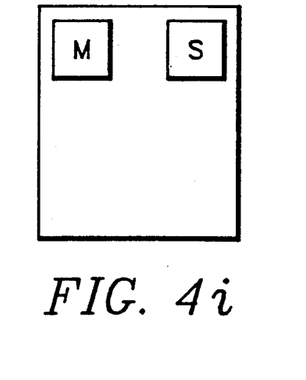

Consequently, the control decoder and read/write controller 20 decodes the rotational movement of the picture to input into the writing/reading clock pulse and writing/reading address signal generators 60, 70 the writing/reading start signals corresponding to the state as shown in FIG. 4b, and delivers the rotational moving signal for the two pictures to the time interval controller 30 through line 31. If the time interval controller 30 delivers to the control decoder and read/write controller 20 the writing/reading start signals corresponding to 4c after the main picture passing the number of m (m>0), the control decoder and read/write controller 20 delivers again the signals to the writing/reading clock pulse and writing/reading signal generators 60, 70 to display them as shown in FIG. 4c. When the state of 4a is changed into the state of 4a, the time interval between the rotational movements of the two pictures is the time during which the main picture vertical synchronizing signal passes the number of m.

In this way, with sequentially operating the keyboard or remo-con, the state 4c moves to the state 4e through 4d, the state 4e to the state 4g through the state 4f after the main picture vertical synchronizing signal passing the number of m, and the state 4g to the original state 4i through the state 4h.

As described above, the present invention provides a time interval between the movements of a plurality of subordinate pictures, the viewer's sight is not agitated.

Although this embodiment specifies the two pictures moving, those skilled in this art may embody the present invention in moving more than two subordinate pictures without departing from the gist of the present invention. Moreover, while the invention has been particularly shown and described with reference to a preferred embodiment, it will be understood by those skilled in the art that modifications in detail may be made without departing from the spirit and scope of the invention.

What is claimed is:

1. In a picture-in-picture-type color television or video-tape-recorder system having a synchronizing separator, a chroma circuit and a microcomputer, a circuit for moving rotationally a plurality of subordinate pictures, said circuit, comprising:

memory means for storing video digital data, said video digital data being written onto or read from said memory means through dual ports;

read/write controller means for generating a first control signal to control a start of writing or reading subordinate picture data onto or from said memory means and a second control signal to select an address for writing or reading said subordinate picture data onto or from said memory means, said read/write controller means receiving mode selecting data, a clock pulse control signal, and a strobe control signal from the microcomputer and main and subordinate picture vertical synchronizing signals separated by a synchronizing separator, said subordinate picture vertical synchronizing signal being used when said subordinate picture data is written onto said memory means, said main picture vertical synchronizing signal being used when said subordinate picture data is read from said memory means;

time interval controller means for receiving a recognition signal for moving rotatably two selected subordinate pictures from a plurality of subordinate pictures and said main picture vertical synchronizing signal to control generation of said first and second control signals for writing and reading said subordinate picture data onto and from said memory means and a third control signal to maintain a fixed time interval between the movements of the two subordinate pictures, said time interval controller means being connected with said read/write controller means;

switching means for switching sequentially and transmitting sequentially analog video chrominance signals for brightness, red, and blue of the two subordinate pictures, said chrominance signals being separated by a chroma circuit;

analog/digital converter means for receiving the analog video chrominance signals from said switching means and for converting the analog video chrominance signals into video digital data;

first data converting and latching means for converting and latching video digital data of said analog/digital converter means into a fixed bit adapted to be stored into said memory means;

writing clock pulse and writing address signal generator means for generating switching signals to control the sequential transmission of said analog video chrominance signals of said switching means, for generating a sampling signal for the digital data conversion by said analog/digital converter means, for generating a first clock pulse for the converting and latching of said first data converting and latching means, for generating a second clock pulse for refreshing the writing, address and control of said memory means, upon receiving said first control signal to control the start of the writing of said read/write controller means, second basic frequency and the subordinate picture vertical and horizontal synchronizing signals being separated by said synchronizing separator;

second data converting and latching means for converting the data read from said memory means into a form adapted for first to third digital/analog data;

first to third digital/analog converter means for converting into analog output signals the first to third digital/analog data received from said second data converting and latching means;

reading clock pulse and reading address signal generator means for generating a reading address signal, a latching clock pulse for the data conversion of said second data converting and latching means, and a third clock pulse for said first to third digital-/analog converter means for converting the data into picture-in-picture analog signals by receiving said first control signal to control the start of the reading from said read/write controller means, first basic frequency supplied to a timing clock and the main picture horizontal and vertical synchronizing signals being separated by said synchronizing separator; and memory control timing and address selecting means for selecting a writing and reading address on a basis of the second clock pulse of said writing clock pulse and writing address signal generator means and the reading address signal of said reading clock pulse and reading address signal generator respectively, according to the first control signal received from said read/write controller means.

2. In a picture-in-picture color television or video tape recording system having a microcomputer, a method for controlling time intervals between movements of the subordinate pictures, comprising the steps of:

checking validity of input data with a signal from the microcomputer;

recognizing the input data as valid data to select a number of picture-in-picture pictures;

making a count of main picture vertical synchronizing signals by receiving a selection signal to select the number of said subordinate pictures so as to establish a time interval between movements of said subordinate pictures and to generate an address signal for starting treatment of said subordinate pictures; and counting values set according to the positions of said subordinate pictures by receiving a control signal to control said starting of said subordinate picture and the address signal to start the time interval between movements of said subordinate pictures to designated positions within said timing interval through any intermediate state according to the number of said main picture vertical synchronizing signals.

3. A method of controlling the display of a plurality of subordinate pictures within a main picture of a video display of a television, comprising the steps of moving the subordinate pictures sequentially from one position to another within the main picture, and maintaining a time interval between the movement of one subordinate picture and the movement of another subordinate picture within the main picture.

4. A method according to claim 3, including the step of receiving a first control signal from a user, to determine the number of subordinate pictures to be displayed.

5. A method according to claim 4, including the step of receiving a second control signal from a user, to determine the time interval between movements of the subordinate pictures within the main picture.

6. A method according to claim 3, including the step of receiving a control signal from a user, to determine the time interval between movements of the subordinate pictures within the main picture.

7. Apparatus for controlling the display of a plurality of subordinate pictures within a main picture of a video display of a television, comprising means for moving the subordinate pictures sequentially from one position to another within the main picture, and means for maintaining a time interval between the movement by said moving means of one subordinate picture and movement by said moving means of another subordinate picture within the main picture.

8. Apparatus according to claim 7, further comprised of means for receiving a control signal from a user, to determine the number of subordinate pictures displayed, and for controlling said moving means in dependence upon said control signal.

9. Apparatus according to claim 7, further comprised of means for receiving a control signal from a user, to determine a time interval between movements of the subordinate pictures within the main picture, and for providing to said maintaining means an input signal representative of said control signal.

10. A circuit adapted to control the movements of one or more subordinate pictures within a main picture of a picture-in-picture type television or video system, the circuit comprising:

memory means for storing video digital data, means for generating a first signal to start the writing or reading of subordinate picture data onto or from the memory, means for selecting an address for writing or reading onto or from said memory means, means for controlling the time interval between movements of one or more subordinate pictures within a main picture;

switching means for providing sequential output analog chrominance signals for one or more subordinate pictures within said main picture, analog-to-digital conversion means for receiving and converting into digital data, analog chrominance signals from the switching means for the purpose of storing said digital data into said memory means, and digital-to-analog conversion means, arranged to convert said digital data from said memory means into analog video signals.

11. A circuit according to claim 10, further comprised of a first data converting and latching means for converting and latching the digital data from the analog-to-digital conversion means into a fixed-bit form adapted to be stored in the memory, and a second data converting and latching means for converting and latching the fixed-bit form data read from the memory into a form adapted to be fed into said digital-to-analog conversion means.

12. A circuit according to claim 11, further comprising a first signal generating means for generating a switching signal to control the sequential output of said analog chrominance signals of said switching means, and for generating a sampling signal for controlling said analog-to-digital conversion means.

13. A circuit according to claim 12, wherein said first signal generating means further generates a first clock pulse for a first data converting and latching means and a second clock pulse for refreshing writing addresses and control of said memory means.

14. A circuit according to claim 13, wherein the digital-to-analog conversion means comprises three digital-to-analog converters, with different ones of said digital-to-analog converters coupled to receive different ones of the output analog chrominance signals.

15. A circuit according to claim 13, further comprised of second signal generating means for generating a reading address signal, a latching clock pulse for the data conversion by the second data conversion and latching means, and a third clock pulse for data conversion by the digital to analog conversion means.

16. A circuit according to claim 15, further comprised of a memory control timing and address selecting means for selecting a writing and reading address from said first signal generating means and a first control signal from said second signal generating means.

17. A circuit according to claim 16, further comprised of a control decoder and read/write controller means for generating a second control signal to control the start of writing or reading subordinate picture data onto or from the memory and a selection signal to select an address for said writing or reading.

18. A picture-in-picture-type color circuit, comprising:

a memory for storing picture-in-picture video digital data;

read/write controller means for generating a first control signal to control the start of writing or reading subordinate picture data onto or from said memory and a second control signal to select an address for writing or reading said subordinate picture data onto or from said memory, said read/write controller means receiving mode selecting data, a clock pulse control signals, a strobe control signal, and main and subordinate picture vertical synchronizing signals;

time interval controller means for receiving a recognition signal for rotating a display of subordinate pictures, for receiving said main picture vertical synchronizing signal, and for generating a third control signal to maintain a fixed time interval between the movements of a plurality of subordinate pictures, said time interval controller means being connected with said read/write controller means;

first data converting means for converting analog chrominance signals for said subordinate picture into video digital data with fixed bit adaptable for storage in said memory;

writing clock pulse and writing address signal generator means for generating a sampling signal and a first clock pulse to control said first data converting means, and a second clock pulse for refreshing writing, address and control of said memory, upon receiving said first control signal, second basic frequency, a subordinate picture vertical synchronizing signal, and a horizontal synchronizing signal;

second data converting means for converting video digital data read from said memory into picture-to-picture analog output signals;

reading clock pulse and reading address signal generator means for generating a reading address signal, and a latching clock pulse for the conversion of said video digital data by said second data converting means, in response to reception of said first control signal, a first basic frequency, a subordinate picture vertical synchronizing signal and a subordinate picture horizontal synchronizing signal; and memory control timing and address selecting means for selecting an address of said memory on a basis of the second clock pulse, the reading address signal, and the first control signal.

19. A method for controlling the moving interval of a number of subordinate pictures in a picture-in-picture-type color television or video tape recording system having a microprocessor, comprising the steps of:

checking validity of input data on a basis of output signals from the microprocessor, to provide valid data;

determining a number of subordinate pictures to be displayed on a main video picture on a basis of valid data by counting main picture vertical synchronizing signals to select the number of said subordinate pictures and thereby establish a desired moving interval of said subordinate pictures and generate address signals for starting of processing of said subordinate pictures; and counting values set according to positions of said subordinate pictures in dependence upon control signals received to control said starting of processing; and generating an address signal to start rotational movement of said subordinate pictures to designated positions within said desired moving interval through any intermediate stage, according to counts of said main picture vertical synchronizing signals.

20. A picture-in-picture-type color circuit, comprising:

memory means for storing video digital data;

read/write controller means for generating a first control signal to control the starting of a writing or reading operation of subordinate picture data onto or from said memory means and a second control signal to select an address for a writing or reading operation of said subordinate picture data onto or from said memory means, said read/write controller means receiving mode selecting data, a clock pulse control signal, a strobe control signal, and main and subordinate picture vertical synchronizing signals;

time interval controller means for receiving a recognition signal for moving rotatably selected subordinated pictures from a plurality of subordinate pictures, for receiving said main picture vertical synchronizing signal, and for applying a third control signal to said read/write controller means to maintain a fixed time interval between the movements of said selected subordinate pictures;

switching means for transmitting sequentially, analog video chrominance signals for said selected subordinate pictures;

analog/digital converter means for converting said analog video chrominance signals into video digital data;

first data converting means for converting and latching said video digital data into a fixed bit adapted to be stored into said memory means;

writing clock pulse and writing address signal generator means for generating switching signals to control said switching means, a sampling signal for the digital data conversion by said analog/digital converter means, a first clock pulse for the converting and latching of said first data converting means, and a second clock pulse for refreshing the writing, address and control of said memory means, upon receiving said first control signal, a second basic frequency and subordinate picture vertical and horizontal synchronizing signals;

second data converting means for converting video digital data read from said memory means into picture-in-picture analog output signals;

reading clock pulse and reading address signal generator means for generating a reading address signal, for generating a latching clock pulse for the converting of said video digital data by said second data converting means, for generating a reading address signal, and for generating a latching clock pulse for said second data converting means, in dependence upon said first control signal, a first basic frequency and main picture horizontal and vertical synchronizing signals; and memory control means for selecting addresses of said memory means, and for generating a memory control signal on a basis of the second clock pulse, the reading address signal and the first control signal.

21. A picture-in-picture-type color video circuit, comprising:

memory means for storing video digital data;

read/write controller means for generating a first control signal to control the starting of a writing or reading operation of subordinate picture data onto or from said memory means and a second control signal to select an address for said writing or reading operation of said subordinate picture data onto or from said memory means to maintain a time interval between changes of positions of selected subordinate pictures from a plurality of subordinate pictures within a larger main picture of a video display, said read/write controller means receiving mode selecting data, a clock pulse control signal, a strobe control signal, and main and subordinate picture vertical synchronizing signals;

first data converting means for converting analog video chrominance signals into video digital data;

writing clock pulse and writing address signal generator means for generating a first clock pulse for controlling the conversion by said first data converting means, and a second clock pulse for refreshing writing, address and control of said memory means in response to said first control signal, a second basic frequency and subordinate picture vertical and horizontal synchronizing signals;

second data converting means for converting video digital data read from said memory means into analog output data;

reading clock pulse and reading address signal generator means for generating a reading address signal, and for generating a third clock pulse for controlling the conversion by said second data converting means, in response to said first control signal, a first basic frequency, and main picture vertical and horizontal synchronizing signals; and memory control timing and address selecting means for selecting addresses of said memory means and generating a memory control signal on a basis of the second clock pulse and the reading address signal, in response to the first control signal.

22. A picture-in-picture-type color circuit, comprising:

memory means for storing video digital data;

read/write controller means for generating a first control signal to control the starting of a writing or reading operation of subordinate picture data onto or from said memory means and a second control signal to select an address for said writing or reading operation of said subordinate picture data onto or from said memory means, said read/write controller means receiving mode selecting data, a clock pulse control signal, a strobe control signal, and main and subordinate picture vertical synchronizing signals;

time interval controller means for receiving a recognition signal for moving rotatably selected subordinate pictures from a plurality of subordinate pictures, and said main picture vertical synchronizing signal, and for applying a third control signal to said read/write controller means to maintain a fixed time interval between the movements of positions of said selected subordinate pictures on a video display of a larger main picture;

switching means for transmitting sequentially analog video chrominance signals for said selected subordinate pictures;

analog/digital converter means for converting said analog video chrominance signals into video digital data;

first data converting means for converting said video digital data into a fixed bit adapted to be stored into said memory means;

second data converting means for converting video digital data read from said memory means into picture-in-picture analog output signals;

signal generating means for generating a sampling signal for controlling the conversion of said analog video chrominance data by said analog/digital converter means, a first clock pulse for controlling the conversion of said first data converting means, a second clock pulse for refreshing writing, address and control of said memory means, a reading address signal, and a third clock pulse for controlling the conversion of said digital video data of said second data converting means, in dependence upon said first control signal, first basic frequency, a basic frequency and subordinate picture vertical and horizontal synchronizing signals; and memory control means for selecting addresses of said memory means on a basis of the second clock pulse and the reading address signal, according to the first control signal.

23. A picture-in-picture-type color circuit, comprising:

memory means for storing video digital data;

read/write controller means for generating a first control signal to control the starting of a writing or reading operation of subordinate picture data onto or from said memory means and a second control signal to select an address for said writing or reading operation of said subordinate picture data onto or from said memory means, said read/write controller means receiving mode selecting data, a clock pulse control signal, a strobe control signal, and main and subordinate picture vertical synchronizing signals;

time interval controller means for receiving a recognition signal for moving rotatably selected subordinate pictures from a plurality of subordinate pictures, and said main picture vertical synchronizing signals, and for applying a third control signal to said read/write controller means to maintain a fixed time interval between the movements of said selected subordinate pictures within a video display of a larger main picture;

switching means for transmitting sequentially analog video chrominance signals for said subordinate pictures;

analog/digital converter means for converting the analog video chrominance signals into video digital data;

first data converting means for converting said video digital data into a fixed bit adapted to be stored into said memory means;

second data converting means for converting video digital data read from said memory means into picture-in-picture analog output signals; and control means coupled to receive said first control signal, a first basic frequency, a second basic frequency and subordinate picture vertical and horizontal synchronizing signals, for generating a sampling signal for controlling the conversion of said analog video chrominance data by said analog/digital converter means, a first clock pulse for controlling the conversion by said first data converting means, a second clock pulse for refreshing writing, address and control of said memory means, and a third clock pulse for controlling the conversion of said digital video data by said second data converting means, and for selecting addresses of said memory means in response to said first and second control signals.

* * * * *

UNITED STATES PATENT AND TRADEMARK OFFICE
CERTIFICATE OF CORRECTION

PATENT NO. : 5,206,714
DATED : April 27, 1993
INVENTOR(S) : Yong-Je Kim

It is certified that error appears in the above-identified patent and that said Letters Patent is hereby corrected as shown below:

Column 1,

Line 51,    replace "said" with --the--;

Column 4,

Line 43,    insert --occupies-- after "picture";

Line 61,    replace "show" with --shown--;

Column 6,

Line 52,    after "generate" insert --and respectively transmit via leads 62, 72,--;

Line 53,    delete "and" (second occurence), insert --and-- after "conversion";

Column 7,

Line 16,    replace "4a" with --4c--;

UNITED STATES PATENT AND TRADEMARK OFFICE
CERTIFICATE OF CORRECTION

PATENT NO. : 5,206,714
DATED : April 27, 1993
INVENTOR(S) : Yong-Je Kim It is certified that error appears in the above-identified patent and that said Letters Patent is hereby corrected as shown below:

Column 11,

Line 5,     replace "signals" with --signal--;

Line 18,     replace "picture" with --pictures--;

Signed and Sealed this

Fourth Day of October, 1994

Attest:

BRUCE LEHMAN

*Attesting Officer*      *Commissioner of Patents and Trademarks*